United States Patent [19]

Liu

[11] 4,247,513

[45] Jan. 27, 1981

[54] METHOD OF MAKING LAMINATED SOLE

[76] Inventor: Chin-Lien Liu, 6F-1, No. 236 Yen-Pin South Road, Taipei, Taiwan

[21] Appl. No.: 20,297

[22] Filed: Mar. 14, 1979

[51] Int. Cl.³ .............. B29C 17/00; B29H 5/00; B29H 8/00
[52] U.S. Cl. .................................. 264/249; 264/259; 264/293; 264/321
[58] Field of Search ............... 264/244, 259, 248, 321, 264/293, 348; 156/245; 12/146 B, 11 BP, 11 BR; 36/28, 30 R, 32 R

[56] References Cited

U.S. PATENT DOCUMENTS

| 2,295,763 | 9/1942 | Sperry | 12/146 BR |
| 2,692,401 | 10/1954 | Stritter | 12/146 BP |
| 2,705,211 | 3/1955 | De Wyk | 156/245 |
| 2,878,153 | 3/1959 | Hackländer | 264/248 |
| 2,976,577 | 3/1961 | Gould | 156/245 |

*Primary Examiner*—W. E. Hoag
*Attorney, Agent, or Firm*—William A. Drucker

[57] ABSTRACT

A method of making sole by laminating a foamed rubber sheet and a solid rubber sheet is disclosed. The lamination of these sheets can be effected without the use of any adhesives or glues and can obtain an excellent interlayer bonding effect.

4 Claims, 1 Drawing Figure

U.S. Patent   Jan. 27, 1981   4,247,513
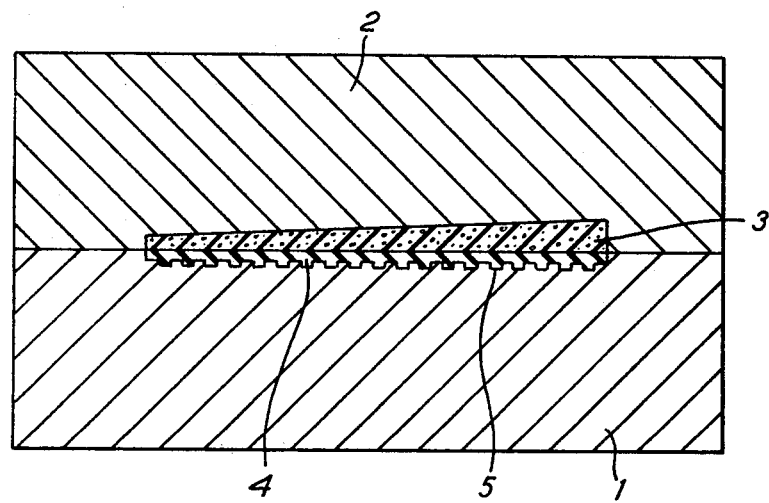

METHOD OF MAKING LAMINATED SOLE

The present invention relates to a laminated sole, and more particularly to a method of making a laminated sole composed of a foamed rubber sheet and a solid rubber sheet.

Soles laminated by foamed rubber sheet and solid rubber sheet have been well known in the art and extensively used. These soles are conventionally made by the steps comprising coating a strongly bonding adhesive on either side of the surface of the sheets to be laminated, allowing the coated adhesive to dry appropriately, superimposing the sheets and applying a force on said sheets, for a considerable length of time, to attain a desired interlayer bonding strength. This method involves a tedious manual operation, which results in low production efficiency and higher cost, and even more the quality of the product thus produced is generally not consistent and will readily cause delamination during use.

To eliminate the shortcomings of the above-mentioned method, the inventor has attempted to make the laminated sheet composed of a foamed rubber sheet and a solid rubber sheet by use of a hot press without the application of adhesives conventionally used in the art but anyhow the combination of the sheets has not been obtained.

Through the various tests, the inventor has astonishingly found out that sufficiently strong interlayer bonding effect can be obtained by using an unvulcanized solid rubber sheet in substitution for the above-mentioned solid rubber sheet to laminate with a foamed rubber sheet in a hot-press mold under the predetermined conditions. However the laminated sheet thus formed would cause considerable warping which leads the product to fail to meet the desired use.

After study of the above mentioned interlayer bonding effect and warping problems, the inventor has reached a conclusion and completed the present invention therefrom.

Specifically speaking, when a foamed rubber sheet and an unvulcanized solid rubber are placed in a superimposed position and hot pressed, the latter will proceed to vulcanization or curing. During this process the said unvulcanized rubber will simultaneously generate (exhibit) bonding and flowing properties by itself and the to be bonded property causes the two layers bonding together and the latter causes material to flow into the micells or voids of the foamed rubber sheet.

The intrusion of the material into the micells of the foamed rubber sheet produces a so-called anchoring effect and this effect operates synergistically works with the bonding property of the material to further strengthen the interlayer bonding of the laminated sheet. Of course, there is no need to use any such adhesives or glues as used in the prior art method.

As noted above, the laminated sheet obtained from this hot press method, when it cools, will be subject to warping. Through the study on this undesirable warping phenomenon, the inventor has ascertained that it is essentially and solely due to the difference in contraction between the two sheets, namely the foamed rubber sheet has a greater contraction ratio compared with that of the unvulcanized rubber sheet which is now vulcanized. In order to overcome this problem, a series of tests has been conducted by the present inventor, which led to the completion of this invention.

The present invention is now described with reference to the single FIGURE of annexed drawing which is a schematic longitudinal section view of a mold containing two sheets to be laminated in accordance with the present invention.

The mold consists of a lower half-mold (1) and an upper half-mold (2). The bottom of the lower half-mold (1), in whose cavity is placed an unvulcanized solid rubber sheet, is provided with plurality of blind holes (5) of appropriate size, for instance, preferably a cylindrical hole having a diameter of less than 10 millimeters, arranged either regularly or randomly.

The solid rubber sheet to be placed in the cavity of the lower half-mold should be so calculated that when the sheet is subjected to the combination of heat and pressure, the material of said sheet, after filling up all the holes formed on the bottom of the half-mold and intruding into the micells of the adjacent foamed rubber sheet (3), should be still sufficient to form a thin layer of a thickness of approximately 2 millimeters or less. This thin layer firmly bonds to the foamed rubber sheet owing to the reasons given above and has considerably good flexibility, therefore said layer will follow the contraction of the foamed rubber sheet to thereby prevent the laminated sheet from warping.

As used herein, the word "foamed rubber sheet" refers to the sheet conventionally made for the purpose of sole making and the word "unvulcanized solid rubber sheet" refers to the sheet that has already had vulcanizing agent added but is not yet completely vulcanized or cured.

The following examples are presented in illustration of the method of this invention and are not intended as an undue limitation on the generally broad scope thereof.

EXAMPLE 1

Into the cavity of the lower half-mold (1) were placed an unvulcanized solid rubber sheet (4) and a foamed rubber sheet (3), both having a predetermined thickness and weight, in superimposed arrangement with the unvulcanized solid rubber sheet contacting with the lower half-mold. The hot pressing was carried out in a press of conventional type at a temperature of 150° C. and under the pressure of 150 Kg/cm$^2$ (gage) for about 2 minutes. After this hot pressing step, the article was removed from the mold and cooled to the ambient temperature. The article thus obtained had a layer of the solid rubber (4) of a thickness of about 2 millimeters and exhibited an excellent interlayer bonding strength confirmed by peeling test. In the meantime this article did not cause warping.

EXAMPLE 2

Example 1 was repeated except that a reduced amount of the unvulcanized solid rubber sheet was used, which is just enough to fill up the holes provided in the lower half-mold.

The article obtained from this example had a plurality of protrusions corresponding to the holes, and these protrusions bonded firmly to the foamed rubber sheet. This article did not cause warping.

What is claimed is:

1. A method, of making a laminated sole, which comprises the steps of:
   (i) providing a sheet of cured foamed rubber
   (ii) providing a sheet of unvulcanised solid rubber (iii) disposing the foamed rubber sheet and the solid rubber sheet in a multi-part openable and closable mold in which a plurality of blind holes open at a major face bounding the cavity of the mold, the solid rubber sheet being placed in contact with said major face (iv) closing said mold to apply pressure forcing said sponge rubber sheet and said solid rubber sheet together, and at the same time applying heating to vulcanize the solid rubber, where-by as a result of said pressure and heating the solid rubber is forced into the interstices of the sponge rubber to form a bond therewith, and into the blind holes of the mold.

2. The method claimed in claim 1 wherein the quantities of sponge rubber sheet and of solid rubber sheet are so selected in relation to the dimensions of the cavity of the mold when closed that, after the application of said pressure and heat the solid rubber is in the form of a plurality of protrusions formed of solid rubber which has passed into said blind holes, said protrusions each being bonded to the surface of the sponge rubber sheet.

3. The method claimed in claim 1 wherein the quantities of sponge rubber sheet and of solid rubber sheet are so selected in relation to the dimensions of the cavity of the mold when closed, that, after the application of said pressure and heat the solid rubber is in the form of a relatively thinner layer bonded at one face to the surface of the sponge rubber and at the opposite face having protrusions formed of solid rubber which has passed into said blind holes.

4. The method claimed in claim 3 wherein said relatively thinner layer of solid rubber has a thickness not exceeding two millimeters.

* * * * *